May 2, 1950            L. F. DALTON            2,506,069
RUBBER-LIKE ARTICLE
Filed April 22, 1947
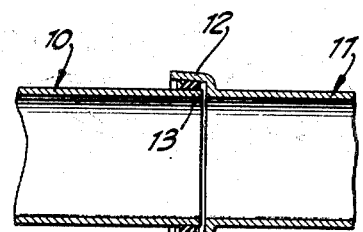
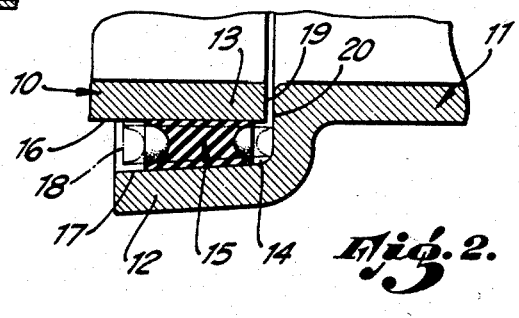
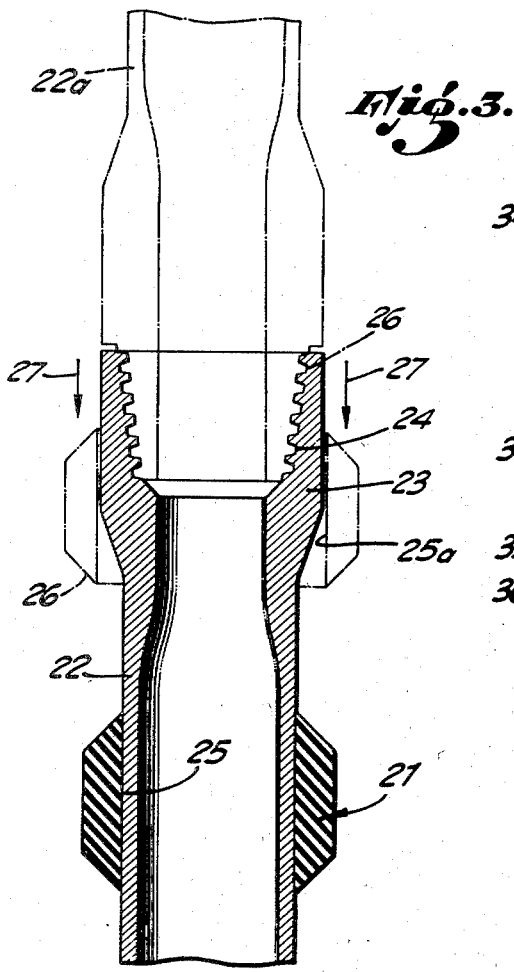
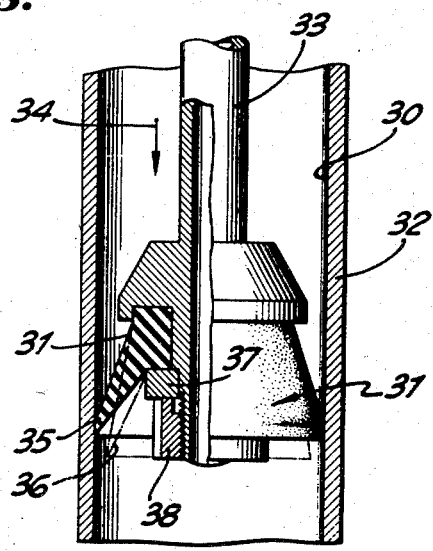
INVENTOR
LESTER F. DALTON,
BY Lyon & Lyon
ATTORNEYS.

Patented May 2, 1950

2,506,069

UNITED STATES PATENT OFFICE 2,506,069

RUBBERLIKE ARTICLE

Lester Frank Dalton, Torrance, Calif.

Application April 22, 1947, Serial No. 743,220

3 Claims. (Cl. 62—91.5)

The installation of rubber-like articles such as rubber sealing rings or wear resistant rubber parts often is made very difficult in practice since it may be desired to have the rubber confined under pressure or mounted in tension in its operative position, and mechanical difficulties are encountered in attempting to assemble the rubber article with respect to its cooperating parts; for example, in mounting a flexible sealing ring in a bell and spigot pipe connection it may not be possible to insert the ring axially into the annular space provided without damaging or destroying the ring in the attempted assembly operation. This is particularly true if the radial thickness of the ring in its normally free shape is greater than the width of the annulus into which it is to be positioned. As another example, the installation of a rubber or rubber-like wear ring on a pipe having enlarged collars may be a difficult and cumbersome operation since the ring must be expanded over a hollow mandrel, pass over the pipe collars and then move axially from the mandrel on to the pipe. As another example, the mounting of a lip-type sealing ring within or over a cylindrical surface may be attended with considerable difficulty since axial movement of the lip of the ring along the surface may tend to invert or turn the ring inside out during the assembly operation.

I have discovered a method of avoiding these difficulties which is broadly applicable to installation of rubber-like articles and, briefly stated, consists in distorting the rubber-like article from its normally free shape and then cooling it to a relatively low temperature so that it does not return to its normally free shape even when the distorting means is relaxed. The article then may be readily moved into operative position and allowed to return to the desired shape upon absorbing heat from its surroundings.

Accordingly, the principal object of this invention is to provide a rubber-like article cooled while held in a distorted shape and maintained at a temperature sufficiently low to prevent return to its free shape in order that installation of the article into operative position may be facilitated.

Another object is to provide a method of installing a rubber-like ring in an annular cavity comprising the steps of deforming the ring, cooling it while it is deformed so that it will maintain its deformed shape when the deforming means is relaxed, maintaining the ring at a low temperature until the time of installation and then permitting the ring to return towards its normal free shape within the cavity.

Another object is to provide a method of installing a rubber-like ring on the external surface of a pipe comprising the steps of cooling the ring while expanded to a diameter sufficiently large to pass axially over the pipe, maintaining the ring at the sufficiently low temperature to prevent return towards its original free shape, installing the ring over the pipe and then allowing it to return to ambient temperature into operative position.

A further object is to provide a rubber-like article distorted from its normally free shape and maintained at a low temperature to prevent change of shape.

Other objects and advantages will appear hereinafter.

In the drawings:

Figure 1 is a sectional plan view of a pair of identical pipe sections coaxially disposed and showing a bell and spigot form of connection.

Figure 2 is a sectional fragmental detail on an enlarged scale showing the bell and spigot joint.

Figure 3 is a sectional elevation partly broken away illustrating a method of installing a rubber-like wear protector ring on a pipe in accordance with my invention.

Figure 4 is a sectional elevation partly broken away illustrating the usefulness of my method of installation of a lip-type sealing ring.

Referring to the drawings, the pipe sections 10 and 11 are coaxially aligned and the pipe 11 is provided with a bell 12 adapted to receive the end 13 of the pipe 10 in telescopic relation. An annulus 14 is thus formed between the end 13 of the pipe section 10 and the bell 12 of the pipe section 11.

A rubber-like sealing ring 15 is mounted in the annulus to prevent leakage between the pipe sections. The ring 15 may be formed of any suitable or desirable type of natural or synthetic rubber or compounds, and the term "rubber-like" is intended to apply to any one or combination of these materials.

It is desirable that the ring 15 shall be mounted in pressure contact with the external surface 16 of the pipe 10 and the internal surface 17 of the bell 12 in order to effect a satisfactory joint. However, considerable difficulty is encountered in attempting to move the rubber-like ring 15 into position within the annulus 14 since friction along the surfaces 16 and 17 would interfere with the axial sliding action required to position the ring within the annulus.

In accordance with my invention I distort the ring 15 by means not shown in order that its inner opening is enlarged and its outer circumference reduced. The shape of the ring as thus distorted is indicated by the phantom lines 18 as shown in Figure 2. The rubber-like ring 15 is cooled by any suitable refrigerant while maintained in its distorted shape and the temperature is maintained sufficiently low to prevent the ring from returning to its normal free shape when the distorting means is relaxed. The temperature of the ring is maintained at this low value by any suitable means, such as, for example, by packing in solid carbon dioxide refrigerant. It will be understood that where reference is made in this specification and claims to a "low temperature," the temperature is sufficiently low to maintain the rubber-like ring in its distorted shape and to prevent it from returning to its normal free shape.

When ready for assembly the ring is removed from the refrigerant and promptly moved axially of the pipe section 10 into the position illustrated by the phantom lines 18. As the ring then absorbs heat from its surroundings it expands inwardly and outwardly into the full line position illustrated. A simple and effective means is thus provided for installing the ring in pressure-tight relationship within the annulus 14 without encountering frictional difficulties along either the surface 16 or surface 17.

A further advantage arises from the return of the ring 15 from its cool distorted shape to its desired shape within the annulus 14. This advantage lies in the ability to separate the end surface 19 of the pipe section 10 from the shoulder 20 of the pipe section 11. When the cold distorted ring is installed within the annulus 14, the surfaces 19 and 20 are in direct contact. As the distorted ring heats to ambient temperature, however, the frictional contact between the ring and the surfaces 16 and 17, together with the change in axial length of the ring, is such as to separate the surfaces 19 and 20 by a considerable amount. This is advantageous since separation of the pipe sections is desirable to prevent damage upon seismic disturbances or settling of the pipe sections.

In that form of my improved method illustrated in Figure 3, the annular rubber-like ring 21 is thereby mounted under stress on a pipe 22. The pipe 22 may be of the type employed in a drill string in the drilling of oil, gas or other wells by the rotary method. Such pipes are commonly provided with enlarged collars 23 at each end. One of these collars on each pipe is generally provided with an internal thread 24 and the collar on the other end of the pipe (not shown) is provided with an external thread 26. A similar pipe 22ᵃ is shown in phantom lines in Figure 3 to illustrate the connection between adjacent pipes under operating conditions in the well. The rubber-like ring 21, however, is installed in position before the threaded connection between the pipes 22 and 22ᵃ is effected.

In the conventional manner of mounting the rubber protector ring 21 on the pipe 22 a hollow mandrel is used which is provided with a central opening sufficiently large to pass over the collar 23. The wall thickness of the mandrel is sufficient to accommodate the compressive force exceeded by the expanded ring which is positioned on a mandrel. The ring 21 is then moved axially from the mandrel on to the pipe 21 and since the normal free size of the central opening in the ring 21 is smaller than the diameter of the pipe 22, the ring 21 grips the pipe under pressure contact. The use of the mandrel in this conventional method of mounting the protector ring 21 is slow and cumbersome and, furthermore, requires the ring to be expanded to a larger diameter than is actually necessary for passing over the collars 23, for when the mandrel is employed the collar must be expanded to a size large enough to encircle the mandrel.

In accordance with my invention I expand the central opening 25 within the rubber-like ring 21 to a diameter shown at 25ᵃ, which will just pass over the outer diameter of the collar 23. The ring 21 is then maintained in this distorted shape as illustrated by the phantom lines 26 while the ring is cooled to a low temperature. The natural resiliency of the ring 21 disappears at this low temperature and prevents the ring from changing from this distorted shape even when the expanding means is relaxed. The ring is maintained at such low temperature until the time of installation on the pipe 22. The ring may be packed in solid carbon dioxide refrigerant for transportation to the point of application to the pipe. The ring is then threaded over the collar 23 in the direction of the arrows 27 and held in such position adjacent the pipe 22 while it absorbs heat from its surroundings and returns to ambient temperature. The ring then attempts to assume its normal free shape and engages the pipe under pressure contact as shown in the drawings at 21.

It will be understood from the above description that this method of threading a cold distorted ring over the collar 23 greatly simplifies the installation of the rings on the pipe; furthermore, no special equipment is needed at the installation site and the entire operation is carried on efficiently and simply with minimum delay.

In Figure 4 is shown a further modification of my improved method in connection with the installation of a lip-type sealing ring for contact with a cylindrical surface. In the arrangement illustrated in Figure 4 the cylindrical surface 30 encircles the lip-type sealing ring 31, but it will be readily understood that the sealing ring 31 could be made of an annular form and arranged to contact an external cylindrical surface if desired. It is assumed that the member 32 is stationary and that it is desired to install the ring 31 at the position illustrated by moving the internal member 33 axially of the stationary member 32 in the direction of the arrow 34. If this operation were attempted with the sealing ring 31 in its operative position illustrated by the heavy lines, the contact between the lip portion 35 of the ring 31 and the cylindrical surface 30 would damage the lip 35 or result in turning the ring inside out and thus render it inoperative.

In accordance with my invention the lip portion 35 of the ring 31 is first deformed inwardly to the position illustrated by the phantom lines 36 so that the maximum diameter of the lip portion 35 is substantially less than that of the cylindrical surface 30. The ring 31 is then cooled to a low temperature while thus distorted. The resilient properties of the ring disappear and it maintains its distorted shape even when the distorted means is relaxed. At the time of installation the ring is removed from the proximity of the refrigerant medium and is installed on the member 33 in the position illustrated. The non-resilient follower 37 and nut 38 are then placed in position and the assembly of the inner member 33 and ring 31 are then moved axially in the direction of the arrow to bring the ring to the desired position. As the ring absorbs heat from its surroundings and returns to ambient temperature the resilient properties again appear and the lip 35 of the ring 31 returns to the position illustrated by the full lines.

It is to be understood that wherever the term "rubber-like" appears in the specification and claims it relates to rubber material or synthetic or any other similar material which is resilient and has rubber-like flexible qualities at ordinary temperatures which become relatively rigid and inflexible at low temperatures.

Having fully described my invention, it is to be understood that I do not wish to be limited to the details herein set forth, but my invention is of the full scope of the appended claims.

I claim:

1. As an article of manufacture, a rubber-like annular ring having its wall thickness reduced from its normal free thickness and packaged with solid carbon dioxide refrigerant to maintain its temperature sufficiently low to prevent any substantial change from its distorted shape.

2. As an article of manufacure, a rubber-like ring distorted from its normal free shape and packed with solid carbon dioxide refrigerant to maintain its temperature sufficiently low to prevent any substantial change from its distorted shape.

3. As an article of manufacture, a rubber-like pipe protector ring having its inner diameter expanded from its normal free size and being packaged with solid carbon dioxide refrigerant to maintain its temperature sufficiently low to prevent any substantial change in shape.

LESTER FRANK DALTON.

REFERENCES CITED

The following references are of record in the file of this patent:

UNITED STATES PATENTS

| Number | Name | Date |
|---|---|---|
| 1,813,178 | Lindsley | July 7, 1931 |
| 1,913,198 | Geyer | June 6, 1933 |
| 1,965,876 | Bettis | July 10, 1934 |
| 1,978,204 | Hurt | Oct. 23, 1934 |
| 1,980,156 | Enrick | Nov. 6, 1934 |
| 1,998,356 | Brown | Apr. 16, 1935 |
| 2,027,961 | Currie | Jan. 14, 1936 |
| 2,138,946 | Trickey | Dec. 6, 1938 |
| 2,166,937 | Bettis | July 25, 1939 |
| 2,167,215 | Leary | July 25, 1939 |
| 2,208,855 | Riley | July 23, 1940 |
| 2,329,000 | Rembert | Sept. 7, 1943 |

OTHER REFERENCES

Everybody's Poultry Magazine, May 1939.